United States Patent
Kazuno

(10) Patent No.: US 11,708,006 B2
(45) Date of Patent: Jul. 25, 2023

(54) INFORMATION PROVISION DEVICE AND INFORMATION PROVISION SYSTEM

(71) Applicant: HONDA MOTOR CO., LTD., Tokyo (JP)

(72) Inventor: Shuichi Kazuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 17/189,209

(22) Filed: Mar. 1, 2021

(65) Prior Publication Data

US 2021/0276449 A1    Sep. 9, 2021

(30) Foreign Application Priority Data

Mar. 5, 2020   (JP) .............................. JP2020-037627

(51) Int. Cl.
*B60L 58/12* (2019.01)
*G01C 21/36* (2006.01)
(Continued)

(52) U.S. Cl.
CPC ............ *B60L 58/12* (2019.02); *B60L 53/305* (2019.02); *B60L 53/66* (2019.02); *B60L 58/16* (2019.02);
(Continued)

(58) Field of Classification Search
CPC .......... B60L 58/12; B60L 53/66; B60L 58/16; B60L 53/305; G01C 21/3469; G01C 21/3626
See application file for complete search history.

(56) References Cited

U.S. PATENT DOCUMENTS

| | | | | |
|---|---|---|---|---|
| 2007/0029121 A1* | 2/2007 | Saitou | ..................... | B60L 58/13 |
| | | | | 903/906 |
| 2009/0254290 A1* | 10/2009 | Kim | ..................... | H01M 10/48 |
| | | | | 702/63 |

(Continued)

FOREIGN PATENT DOCUMENTS

| | | |
|---|---|---|
| GN | 110386029 A | 10/2019 |
| JP | 2011022136 A | 2/2011 |

(Continued)

OTHER PUBLICATIONS

English Translation of WO 2019093742 A1 Title: Method for Automated Selection and Determination of Filling, Autogas Filling, or Charging Station When Refueling, Autogas Refueling, or Recharging is Required During Automated Driving Author: Mori Masaya (Year: 2019) [U continue] Date: Apr. 18, 2019 (Year: 2019).*

*Primary Examiner* — James J Lee
*Assistant Examiner* — Steven Vu Nguyen
(74) *Attorney, Agent, or Firm* — CKC & Partners Co., LLC

(57) ABSTRACT

An information provision device and an information provision system that can reduce user anxiety when the charge amount of a battery has decreased are provided. A vehicle 100 is provided with a charge amount determination unit 611 that determines whether a charge amount of a battery 40 is less than a predetermined threshold; a minimum remaining travel distance calculation unit 613 that calculates a minimum remaining travel distance on the basis of error information for the vehicle 100 when the charge amount of the battery 40 is less than the predetermined threshold; and a display control unit 616 that displays, on a display unit 64 of a display device 60, charging equipment information related to charging equipment 300 present within a distance (Continued)

that can be traveled to in accordance with the minimum remaining travel distance.

3 Claims, 6 Drawing Sheets

(51) Int. Cl.
   *B60L 58/16* (2019.01)
   *B60L 53/30* (2019.01)
   *B60L 53/66* (2019.01)
   *G01C 21/34* (2006.01)

(52) U.S. Cl.
   CPC ..... *G01C 21/3469* (2013.01); *G01C 21/3626* (2013.01)

(56) References Cited

U.S. PATENT DOCUMENTS

| | | |
|---|---|---|
| 2010/0138142 A1 | 6/2010 | Pease |
| 2013/0158758 A1* | 6/2013 | Kim ........................ G07C 5/004 701/123 |
| 2015/0298565 A1 | 10/2015 | Iwamura et al. |
| 2019/0126768 A1 | 5/2019 | Niwa et al. |
| 2019/0265716 A1* | 8/2019 | Nasu ........................ B60L 53/36 |

FOREIGN PATENT DOCUMENTS

| | | |
|---|---|---|
| JP | 2019086841 A | 6/2019 |
| JP | 2019149854 A | 9/2019 |
| WO | 2014033944 A1 | 3/2014 |

\* cited by examiner

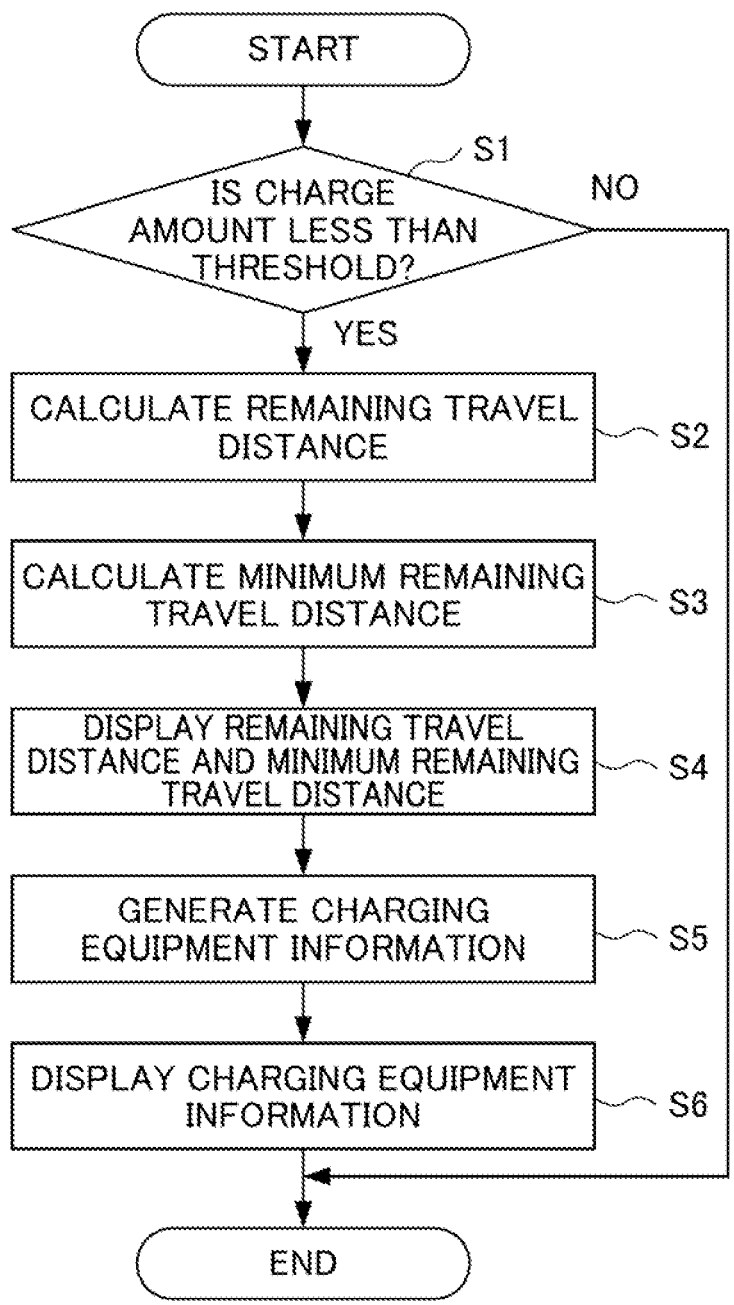

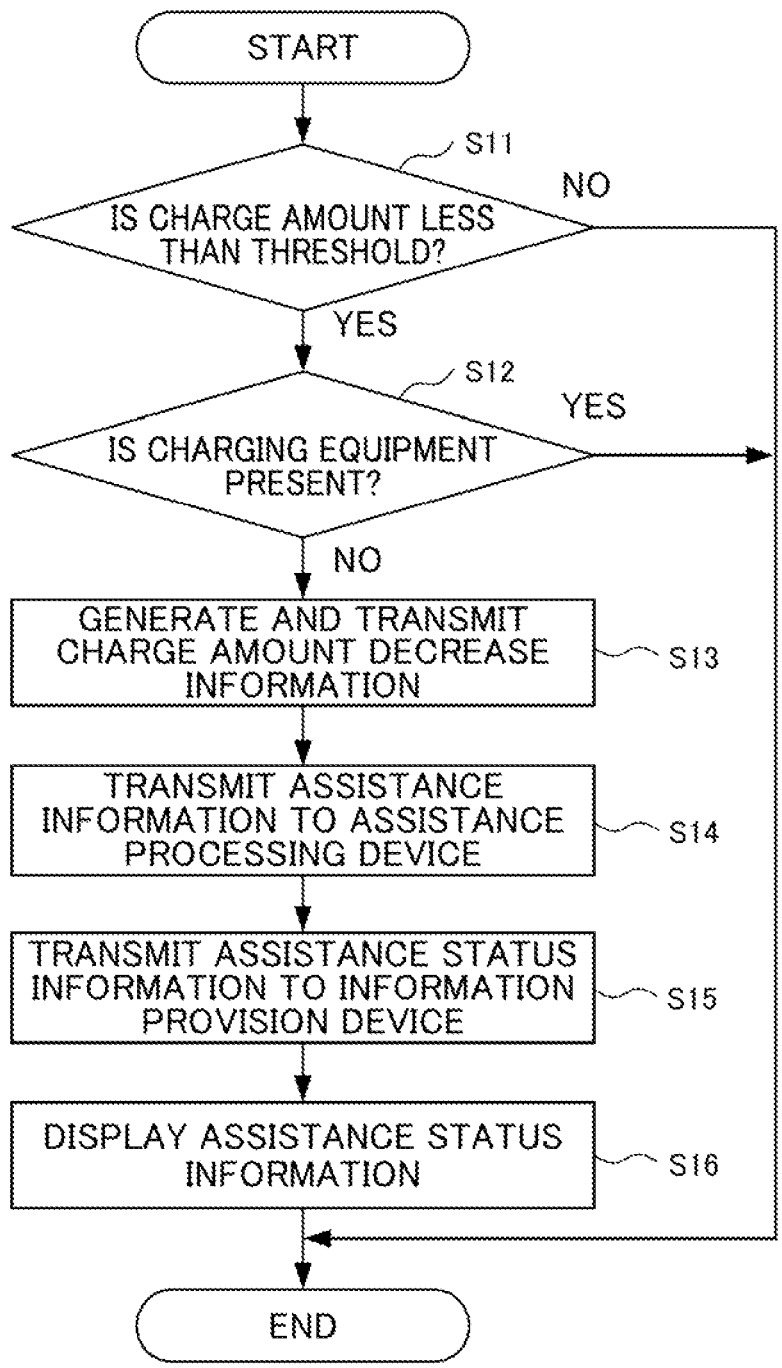

INFORMATION PROVISION DEVICE AND INFORMATION PROVISION SYSTEM

This application is based on and claims the benefit of priority from Japanese Patent Application No. 2020-037627, filed on 5 Mar. 2020, the content of which is incorporated herein by reference.

BACKGROUND OF THE INVENTION

Field of the Invention

The present invention relates to an information provision device and an information provision system.

Related Art

In the past, techniques have been proposed for, in a vehicle equipped with a battery, such as an electric automobile, a hybrid automobile, or a fuel cell vehicle, performing charging when the charge amount of the battery has decreased. For example, in order to make it possible to charge an electric power storage device without traveling to a charging station, the movable body rescue system described in Patent Document 1, upon receiving from a first movable body a help signal requesting supply of electric power to the first movable body from one of a plurality of second movable bodies, uses first information and second information to select from the plurality of second movable bodies an electric power supply movable body to supply electric power to the first movable body.

Patent Document 1: Japanese Unexamined Patent Application, Publication No. 2019-86841

SUMMARY OF THE INVENTION

Such a vehicle that is equipped with a battery displays, on for example a display device in the vehicle, information indicating to a user that the battery charge amount has decreased when the battery charge amount has decreased. However, there are cases where such information does not include error in a component of the vehicle such as with deterioration of the battery, and this can cause anxiety for the user.

An object of the present invention is to provide an information provision device and an information provision system that can reduce user anxiety when the charge amount of a battery has decreased.

An information provision device (for example, a display device 60 and a battery sensor 42 which are described below) according to an aspect of the present invention is provided with a charge amount determination unit (for example, a charge amount determination unit 611 which is described below) that determines whether a charge amount of a battery is less than a predetermined threshold; a minimum remaining travel distance calculation unit (for example, a minimum remaining travel distance calculation unit 613 which is described below) that, when the charge amount of the battery is less than the predetermined threshold, calculates a minimum remaining travel distance on the basis of error information for a vehicle; and a display control unit (for example, a display control unit 616 which is described below) that displays, on a display device, charging equipment information relating to charging equipment present within a distance that can be traveled to in accordance with the minimum remaining travel distance.

The error information includes a lower limit for the average fuel efficiency of the vehicle, accuracy error for a vehicle sensor of the vehicle, and deterioration error for the battery.

The information provision device is further provided with a remaining travel distance calculation unit (for example, a remaining travel distance calculation unit 612 which is described below) that, when the charge amount of the battery is less than the predetermined threshold, calculates a remaining travel distance from an average fuel efficiency of the vehicle.

An information provision system (for example, an information provision system 1 described below) according to another aspect of the present invention includes the information provision device (for example, the display device 60 and the battery sensor 42 which are described below), a server (for example, a server 200 described below) communicably connected to the information provision device, and an assistance processing device (for example, an assistance processing device 400 described below) communicably connected to the server, wherein the information provision device has an equipment determination unit (for example, an equipment determination unit 614 described below) that, when the charge amount of the battery is less than the predetermined threshold, determines whether charging equipment is present within a distance that can be traveled to in accordance with a remaining travel distance calculated from an average fuel efficiency of the vehicle; and an information generation unit (for example, an information generation unit 615 described below) that, when the equipment determination unit determines that the charging equipment is not present, generates position information for the vehicle and charge amount decrease information indicating a decrease of the charge amount, and transmits the position information for the vehicle and the charge amount decrease information to the server, and the server has an assistance information generation unit (for example, an assistance information generation unit 211 described below) that, upon receiving the position information and the charge amount decrease information, generates, on the basis of the position information and the charge amount decrease information, assistance information for assisting the vehicle, and transmits the assistance information to the assistance processing device; and a status information generation unit (for example, a status information generation unit 212 described below) that generates, on the basis of the assistance information, status information indicating a status of assistance for the vehicle, and transmits the status information to the information provision device.

By virtue of the present invention, it is possible to provide an information provision device and an information provision system that can reduce user anxiety when the charge amount of a battery has decreased.

BRIEF DESCRIPTION OF THE DRAWINGS

FIG. 5 is a flow chart illustrating processing by the information provision system; and FIG. 6 is a flow chart illustrating processing by the information provision system.

DETAILED DESCRIPTION OF THE INVENTION

Figure 1:
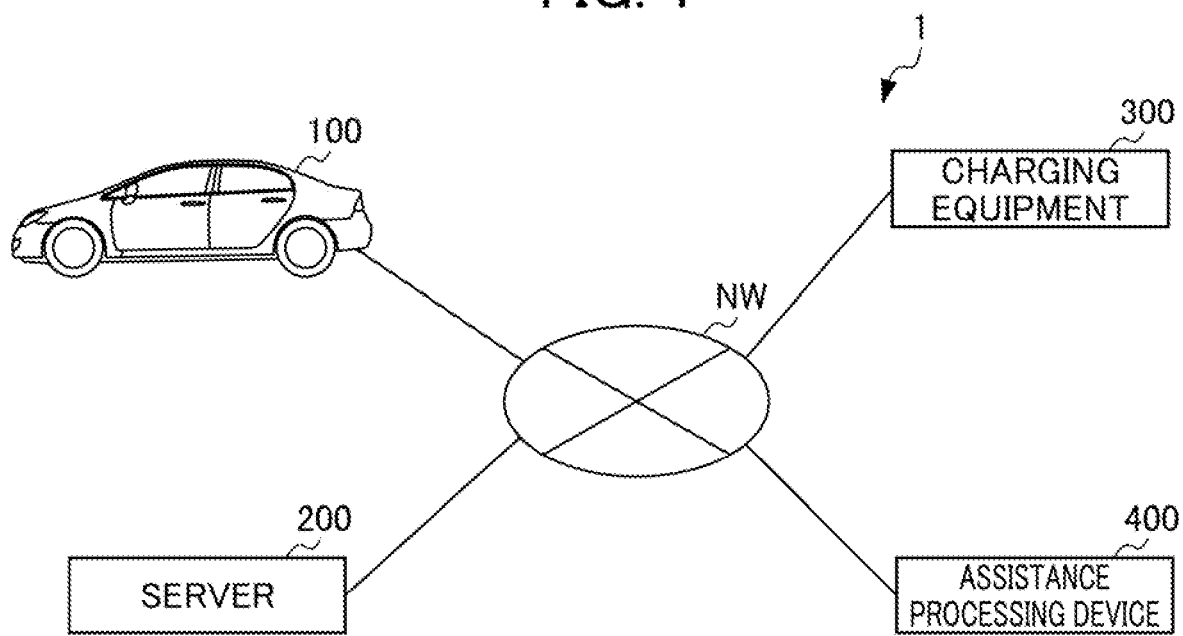
FIG. 1 is a view illustrating an example of a configuration of an information provision system according to an embodiment.

With reference to the drawings, description is given below regarding an embodiment of an information provision device and an information provision system according to the present invention. FIG. 1 is a view illustrating an example of a configuration of an information provision system 1 according to the present embodiment. As illustrated in FIG. 1, the information provision system 1 is provided with a vehicle 100, a server 200, charging equipment 300, and an assistance processing device 400.

The vehicle 100 is an electric automobile, for example. In the present embodiment, the vehicle 100 is given as an electric automobile, but it is sufficient if the vehicle 100 is a vehicle in which a battery that supplies electric power for travel is installed. The vehicle 100 may be a hybrid automobile or a fuel cell vehicle.

The server 200 is communicably connected, via a network NW, to the vehicle 100, the charging equipment 300, and the assistance processing device 400. The server 200 generates assistance information for assisting the vehicle 100, and transmits the assistance information to the assistance processing device 400. The server 200 also generates status information that indicates the status of assistance for the vehicle 100, and transmits the status information to the vehicle 100.

The charging equipment 300 is a facility that can charge the battery of the vehicle 100. For example, electric power is supplied from the charging equipment 300 to the vehicle 100 by an electric power line from the charging equipment 300 being electrically connected to an electric power supply port of the vehicle 100. By this, the battery of the vehicle 100 is charged.

The assistance processing device 400 is provided at a facility for assisting the vehicle 100, and accepts from the server 200 assistance information for assisting the vehicle 100. The assistance processing device 400 is, for example, provided at an automobile dealer, a breakdown assistance business, or a vehicle maintenance business.

Next, description is given regarding a configuration of the vehicle 100 in which is provided an information provision device according to an embodiment of the present invention.

Figure 2:
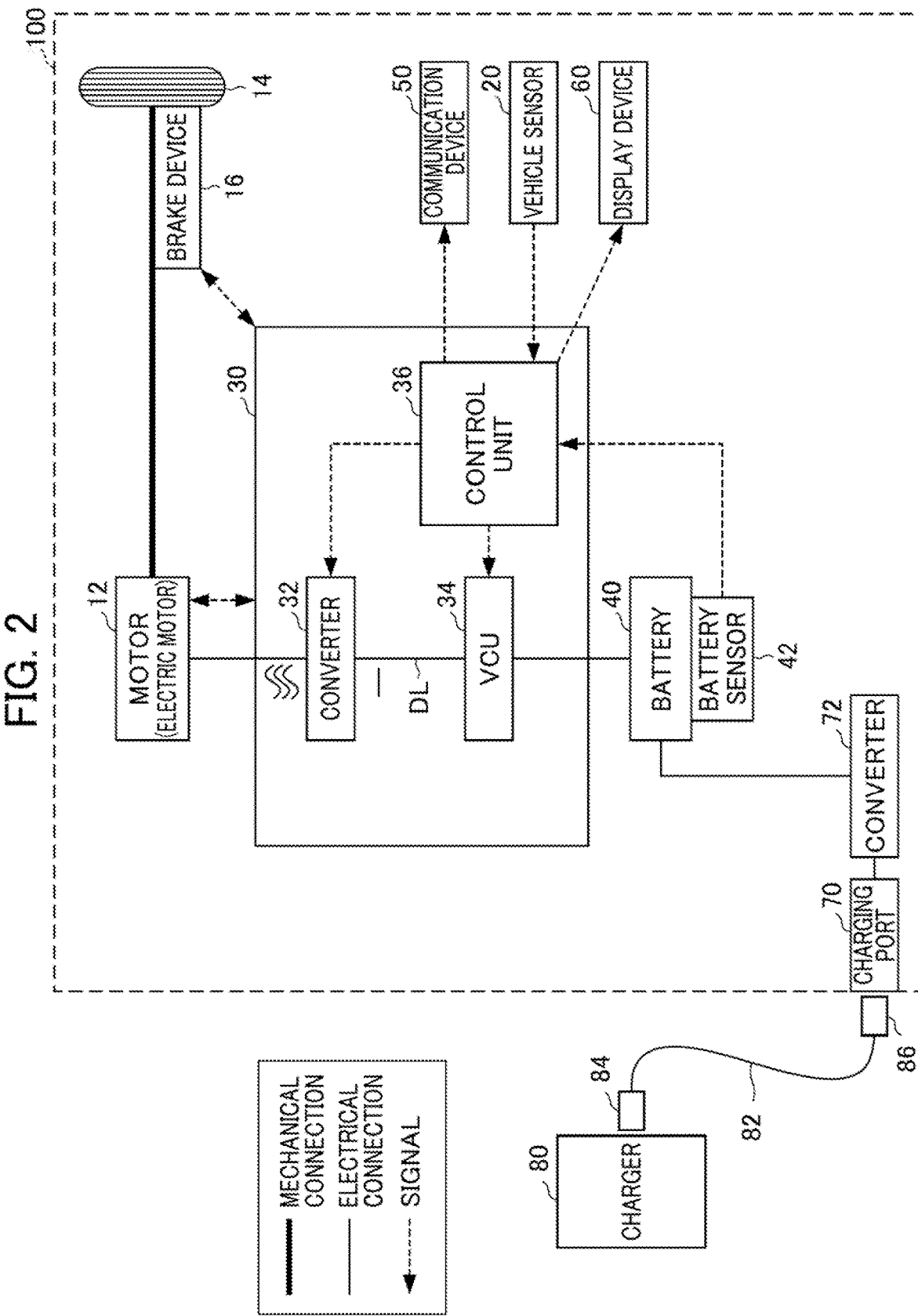
FIG. 2 is a view illustrating an example of a configuration of a vehicle.

FIG. 2 is a view illustrating an example of a configuration of the vehicle 100. As illustrated in FIG. 2, the vehicle 100 is provided with, for example, a motor 12; a drive wheel 14; a brake device 16; a vehicle sensor 20; a power control unit (PCU) 30; a battery (secondary battery) 40; a battery sensor 42 that has a voltage sensor, a current sensor, a temperature sensor, and the like; a communication device 50; a display device 60; a charging port 70; and a converter 72.

The motor 12 is a three-phase AC motor, for example. The rotor of the motor 12 is connected to the drive wheel 14. The motor 12 uses supplied electric power to output motive power to the drive wheel 14. The motor 12 also uses kinetic energy of the vehicle 100 to generate electric power when the vehicle 100 is decelerating.

The brake device 16 is provided with, for example, a brake caliper, a cylinder that transmits hydraulic pressure to the brake caliper, and an electric motor that causes hydraulic pressure to occur in the cylinder. As a backup, the brake device 16 may be provided with a mechanism that transmits, via a master cylinder, hydraulic pressure that occurs due to operation of a brake pedal to the cylinder. The brake device 16 is not limited to the configuration described above, and may be an electronically controlled hydraulic brake device that transmits hydraulic pressure from a master cylinder to the cylinder.

The vehicle sensor 20 is provided with an accelerator opening degree sensor, a vehicle speed sensor, and a brake stepping amount sensor. The accelerator opening degree sensor is attached to an accelerator pedal, which is an example of an operation piece that accepts an acceleration instruction made by the driver. The accelerator opening degree sensor detects an amount of operation of the accelerator pedal, and outputs the amount of operation to a control unit 36 and the display device 60 as an accelerator opening degree. The vehicle speed sensor is provided with, for example, wheel speed sensors that are respectively attached to the wheels, and a speed calculator. The vehicle speed sensor combines the wheel speeds detected by the wheel speed sensors to derive the speed of the vehicle (vehicle speed), and outputs the vehicle speed to the control unit 36 and the display device 60. The brake stepping amount sensor is attached to the brake pedal. The brake stepping amount sensor detects the amount of operation of the brake pedal, and outputs the amount of operation to the control unit 36 and the display device 60 as a brake stepping amount.

The PCU 30 is provided with, for example, a converter 32, a voltage control unit (VCU) 34, and the control unit 36. Having a configuration in which these components are brought together as the PCU 30 is merely an example, and these components may be arranged in a decentralized fashion.

The converter 32 is an AC-DC converter, for example. A direct current side terminal of the converter 32 is connected to a direct current link DL. The battery 40 is connected to the direct current link DL via the VCU 34. The converter 32 converts the alternating current generated by the motor 12 to a direct current, and outputs the direct current to the direct current link DL.

The VCU 34 is a DC-DC converter, for example. The VCU 34 boosts the electric power supplied from the battery 40, and outputs the boosted power to the direct current link DL.

The control unit 36 is provided with, for example, a motor control unit, a brake control unit, and a battery and VCU control unit. The motor control unit, the brake control unit, and the battery and VCU control unit may be replaced by respectively separate control devices, such as a motor ECU, a brake ECU, and a battery ECU, for example.

The motor control unit controls the motor 12 on the basis of an output from the vehicle sensor 20. The brake control unit controls the brake device 16 on the basis of an output from the vehicle sensor 20. The battery and VCU control unit calculates a state of charge (SOC; charge amount) of the battery 40 on the basis of an output from the battery sensor 42 attached to the battery 40, and outputs the SOC to the VCU 34. The VCU 34 causes the voltage of the direct current link DL to rise in accordance with an instruction from the battery and VCU control unit.

The battery 40 is a secondary battery such as a lithium ion battery, for example. The battery 40 stores electric power introduced from a charger 80 that is outside the vehicle 100, and discharges electric power for the vehicle 100 to travel. The battery sensor 42 is provided with a current sensor, a voltage sensor, and a temperature sensor, for example. The battery sensor 42 detects a current value and a voltage value for the battery 40, as well as the temperature of the battery 40, for example. The battery sensor 42 outputs the detected current value, voltage value, and temperature, for example, to the control unit 36 and the communication device 50.

The communication device 50 includes a wireless module for connecting with the network NW which is a cellular network, a Wi-Fi network, or the like. The communication device 50 communicates with the server 200 and the like via the network NW which is illustrated in FIG. 1. The display device 60 displays various items of information, and executes predetermined functionality. The configuration of the display device 60 is described below.

The charging port 70 is provided facing outward from the vehicle body of the vehicle 100. The charging port 70 is connected to the charger 80 via a charging cable 82. The charging cable 82 is provided with a first plug 84 and a second plug 86. The first plug 84 is connected to the charger 80, and the second plug 86 is connected to the charging port 70. Electricity supplied from the charger 80 is supplied to the charging port 70 via the charging cable 82.

The charging cable 82 also includes a signal cable that is attached to an electric power cable. The signal cable facilitates communication between the vehicle 100 and the charger 80. Accordingly, each of the first plug 84 and the second plug 86 is provided with an electric power connector and a signal connector.

The converter 72 is provided between the battery 40 and the charging port 70. The converter 72, for example, converts a current, which is an alternating current and is introduced from the charger 80 via the charging port 70, to a direct current. The converter 72 outputs the direct current resulting from the conversion to the battery 40.

Figure 3:
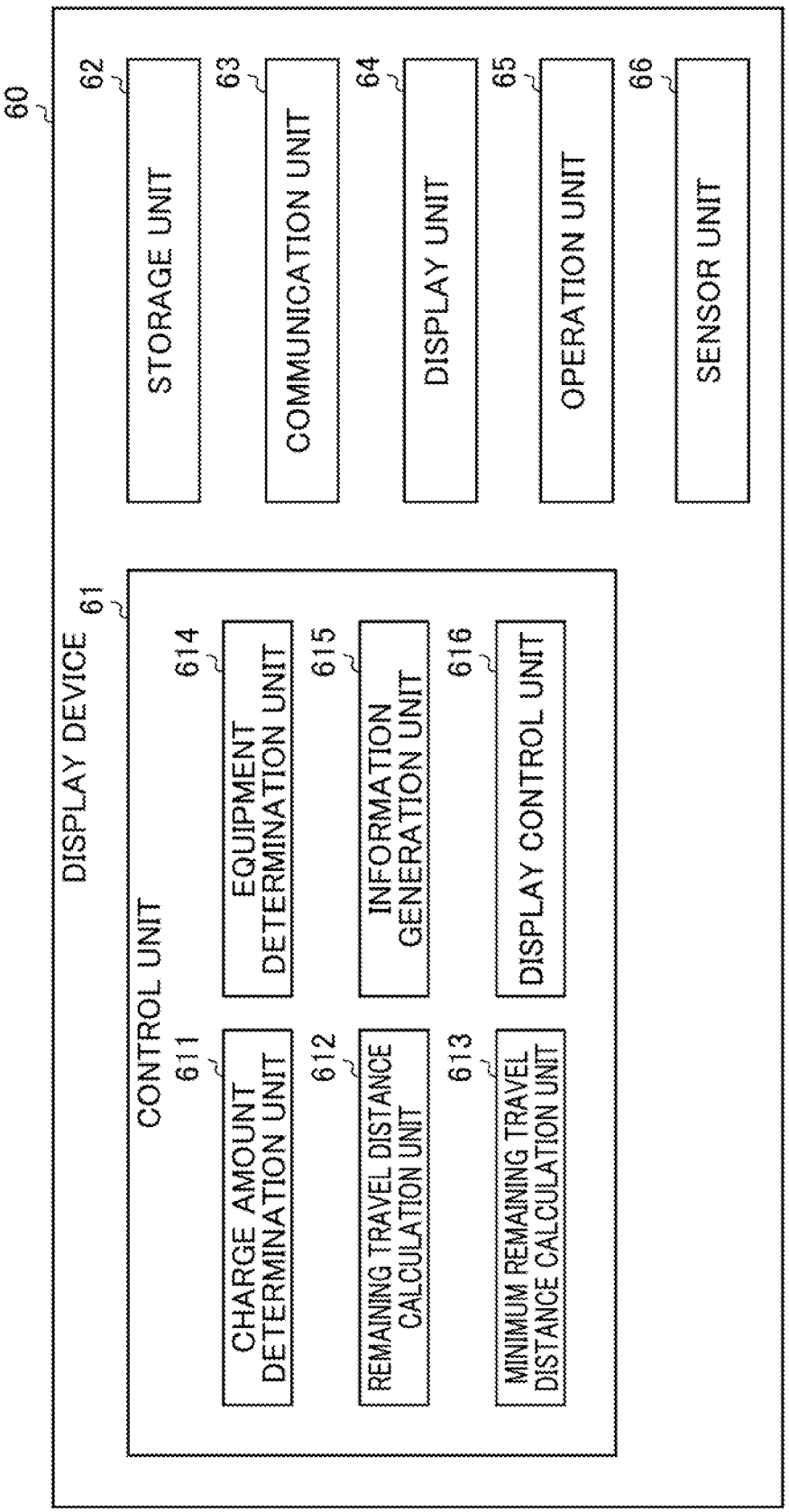
FIG. 3 is a view illustrating an example of a configuration of a display device.

FIG. 3 is a view illustrating an example of a configuration of the display device 60. The display device 60 is provided with a control unit 61, a storage unit 62, a communication unit 63, a display unit 64, an operation unit 65, and a sensor unit 66. The control unit 61 is achieved by a hardware processor such as a central processing unit (CPU) executing a program (software), for example. Some or all of these components may be achieved by hardware (includes circuitry) such as a large-scale integration (LSI), an application-specific integrated circuit (ASIC), a field-programmable gate array (FPGA), or a graphics processing unit (GPU), and may be achieved by collaboration between software and hardware. The program may be stored in advance in a storage device (provided with a non-transient storage medium) such as a hard disk drive (HDD) or a flash memory. The program may be stored in a removable storage medium (a non-transient storage medium) such as a DVD or a CD-ROM, and be installed when the storage medium is inserted to the drive device.

Something that combines the display device 60 and the battery sensor 42 is an example of an "information provision device". Some of the functionality of the display device 60 may be functionality of the control unit 36. In this case, something that combines the display device 60, the battery sensor 42, and a part of the control unit 36 is an example of an "information provision device".

The storage unit 62 is, for example, achieved by RAM or a storage device provided with a non-transient storage medium such as an HDD, a flash memory, an EEPROM, or a ROM. The storage unit 62 stores map information, position information, or the like, for example.

The communication unit 63 is a communication interface for communicating with an external device such as the server 200. The communication unit 63 is also provided with a telematics communication unit (TCU) or the like, and is capable of transmitting and receiving data to and from the network NW or the like.

The display unit 64 is a device that displays an image. The display unit 64 is a liquid crystal display (LCD), an organic electroluminescence (EL) display, or the like for example. The operation unit 65 is configured by, for example, a button for operating the display unit 64. The display unit 64 and the operation unit 65 may be a touch panel in which functionality of the display unit 64 and the operation unit 65 are integrally configured. In this case, the operation unit 65 may be a graphical user interface (GUI) switch that is displayed on the display unit 64. The operation unit 65 may be a mechanical button.

The display unit 64 may be substituted by the display of an information terminal that the driver uses. The information terminal is a smartphone, a tablet, a laptop computer, a game device, or the like, for example. By the driver setting the information terminal that they use on a cradle installed on or nearby the instrument panel of the vehicle 100, the information terminal can carry out a similar display to that of the display unit 64 which is provided in the instrument panel.

The sensor unit 66 includes a global positioning system (GPS) sensor, a gyro sensor, or the like. In addition to these, the sensor unit 66 may also include a sensor such as a geomagnetic sensor or an acceleration sensor, for example. The sensor unit 66 is provided with functionality for detecting position information, and receives a GPS satellite signal via the GPS sensor, and positions position information (for example, latitude and longitude) for the vehicle 100. The positioning by the sensor unit 66 is performed at a predetermined time interval (for example, at an interval of three seconds). The positioned position information is stored in the storage unit 62 as position information.

The control unit 61 uses the communication unit 63 to communicate with the server 200 and transmit a request from a user to the server 200 in response to an operation by the user, and makes a push notification based on information received from the server 200, for example. The control unit 61 causes information provided by the server 200 to be displayed on the display unit 64.

Next, description is given regarding processing by the control unit 61. As illustrated in FIG. 3, the control unit 61 is provided with a charge amount determination unit 611, a remaining travel distance calculation unit 612, a minimum remaining travel distance calculation unit 613, an equipment determination unit 614, an information generation unit 615, and a display control unit 616.

The charge amount determination unit 611 determines whether the charge amount of the battery 40 is less than a predetermined threshold. The predetermined threshold may be a charge amount of a degree at which a warning display prompting charging of the battery 40 is displayed on the display unit 64, after the charge amount of the battery 40 has decreased, for example.

When the charge amount of the battery 40 is less than the predetermined threshold, the remaining travel distance calculation unit 612 calculates the remaining travel distance from the average fuel efficiency of the vehicle 100.

When the charge amount of the battery 40 is less than the predetermined threshold, the minimum remaining travel distance calculation unit 613 calculates the minimum remaining travel distance on the basis of error information for the vehicle 100. The error information includes a lower limit for the average fuel efficiency of the vehicle 100, accuracy error for the vehicle sensor 20 of the vehicle 100, and deterioration error for the battery 40.

The lower limit of the average fuel efficiency of the vehicle 100 may be set to a value that is $1\sigma$ or $3\sigma$ of a normal distribution of the average fuel efficiency, for example. The accuracy error for the vehicle sensor 20 of the vehicle 100 may be the lowest value of the accuracy errors for respective sensors that make up the vehicle sensor 20, or an average of the accuracy errors for respective sensors. The deterioration error for the battery 40 may be obtained from a rate of deterioration of the battery 40 with respect to usage time, for example. From the lower limits for the average fuel efficiency of the vehicle 100, the accuracy error for the vehicle sensor 20 of the vehicle 100, and the deterioration error for the battery 40, the minimum remaining travel distance calculation unit 613 calculates, as the minimum remaining travel distance, a remaining travel distance assuming a case where the remaining travel distance of the vehicle 100 is the lowest (shortest).

When the charge amount of the battery 40 is less than the predetermined threshold, the equipment determination unit 614 determines whether the charging equipment 300 is present within a distance that can be traveled to in accordance with the remaining travel distance calculated by the remaining travel distance calculation unit 612.

When the equipment determination unit 614 determines that the charging equipment 300 is not present within a distance that can be traveled to in accordance with the remaining travel distance, the information generation unit 615 generates position information for the vehicle 100 and charge amount decrease information indicating a decrease of the charge amount. The information generation unit 615 transmits the position information and the charge amount decrease information to the server 200. The charge amount decrease information includes the charge amount of the vehicle 100, the remaining travel distance, the vehicle type of the vehicle 100, and the model of the battery 40, for example.

The display control unit 616 displays the remaining travel distance calculated by the remaining travel distance calculation unit 612 and the minimum remaining travel distance calculated by the minimum remaining travel distance calculation unit 613 on the display unit 64. The display control unit 616 displays, on the display unit 64, charging equipment information relating to charging equipment 300 that is present within a distance that can be traveled to in accordance with the minimum remaining travel distance. Specifically, on the basis of the position information for the vehicle 100, map information, and the minimum remaining travel distance, the display control unit 616 searches for charging equipment 300 present within a distance that can be traveled to in accordance with the minimum remaining travel distance. The display control unit 616 then displays, on the display device, charging equipment information relating to the charging equipment 300 that was found. The charging equipment information includes position information for the charging equipment 300, equipment information such as output electric power for the charging equipment 300, price information for the charging equipment 300, and the like, for example.

When the equipment determination unit 614 determines that charging equipment 300 is not present within the distance that can be traveled to in accordance with the remaining travel distance, the display control unit 616 displays, on the display unit 64, status information that indicates the status of assistance for the vehicle 100 and is received from the server 200. The status information includes, for example, an estimated arrival time for an assistance vehicle from an assistance business such as an automobile dealer, a breakdown assistance business, or a vehicle maintenance business that has an assistance processing device 400 to reach the vehicle 100, position information for the assistance vehicle, and equipment information for the assistance vehicle.

Figure 4:
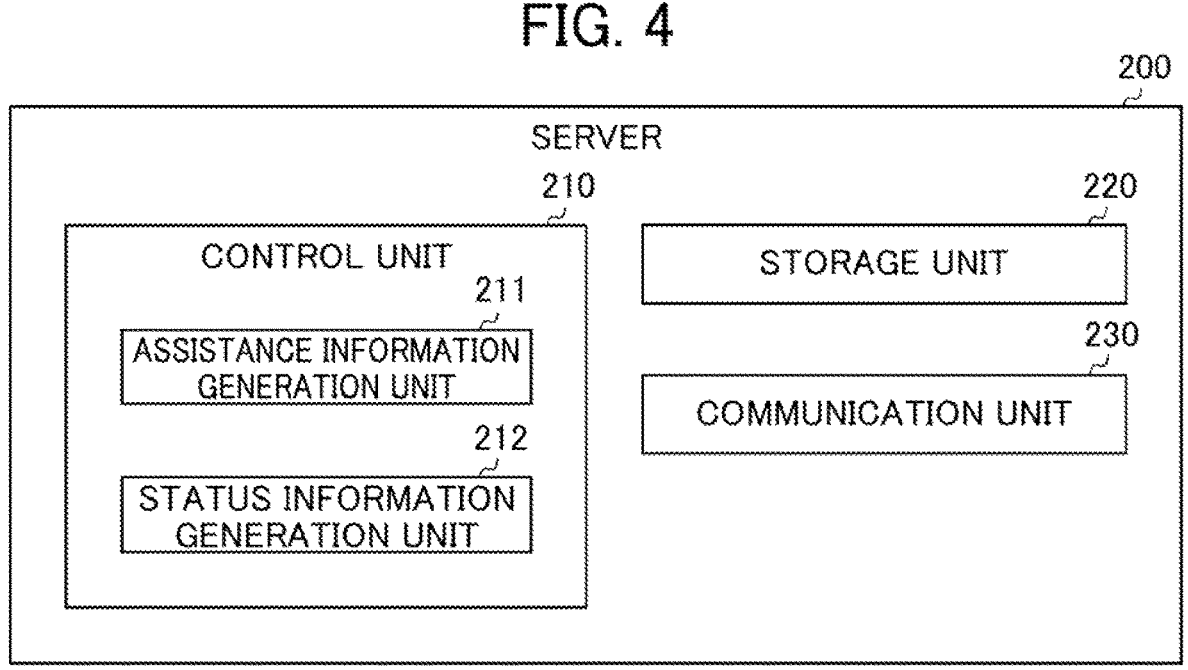
FIG. 4 is a view illustrating an example of a configuration of a server.

FIG. 4 is a view illustrating an example of a configuration of the server 200. As illustrated in FIG. 4, the server 200 is provided with a control unit 210, a storage unit 220, and a communication unit 230. The various functions of the control unit 210 are, for example, achieved by a processor such as a CPU executing a program (software) stored on a storage device. Some or all of these functional units may be achieved by hardware such as an LSI, an ASIC, or an FPGA, and may be achieved by collaboration between software and hardware.

The storage unit 220 is, for example, achieved by RAM or a storage device provided with a non-transient storage medium such as an HDD, a flash memory, an EEPROM, or a ROM. The communication unit 230 is a communication interface for communicating with another device via the network NW.

Next, description is given regarding processing by the control unit 210. The control unit 210 is provided with an assistance information generation unit 211, and a status information generation unit 212.

Upon receiving position information and charge amount decrease information from the display device 60, the assistance information generation unit 211 generates, on the basis of the position information and the charge amount decrease information, assistance information for assisting the vehicle 100, and transmits the assistance information to the assistance processing device 400. The assistance information for assisting the vehicle 100 includes position information for the vehicle 100 for which the charge amount has decreased, the temperature of the location where the vehicle 100 is positioned, the time when the charge amount decreased, the remaining travel distance, the vehicle type of the vehicle 100, the model of the battery 40, and the like. By receiving such assistance information, the assistance processing device 400 can cause an assistance business to have an assistance vehicle or the like to head toward the vehicle 100 and charge the vehicle 100.

The status information generation unit 212 generates, on the basis of the assistance information generated by the assistance information generation unit 211, status information that indicates the status of assistance for the vehicle 100, and transmits the status information to the display device 60 of the vehicle 100. As described above, the status information includes, for example, an estimated arrival time for an assistance vehicle from an assistance business such as an automobile dealer, a breakdown assistance business, or a vehicle maintenance business that has an assistance processing device 400 to reach the vehicle 100, position information for the assistance vehicle, and equipment information for the assistance vehicle.

FIG. 5 is a flow chart illustrating processing by the information provision system 1. In step S1, the charge amount determination unit 611 determines whether the charge amount of the battery 40 is less than the predetermined threshold. If the charge amount is less than the predetermined threshold (YES), the processing transitions to step S2, and if the charge amount is not less than the predetermined threshold (NO), the processing ends.

In step S2, the remaining travel distance calculation unit 612 calculates the remaining travel distance from the average fuel efficiency of the vehicle 100. In step S3, the minimum remaining travel distance calculation unit 613 calculates the minimum remaining travel distance on the basis of the error information for the vehicle 100.

In step S4, the display control unit 616 displays the remaining travel distance calculated by the remaining travel distance calculation unit 612 and the minimum remaining travel distance calculated by the minimum remaining travel distance calculation unit 613 on the display unit 64. By this, a user of the vehicle 100 can grasp both of the remaining travel distance and the minimum remaining travel distance.

In step S5, the display control unit 616 generates charging equipment information relating to charging equipment 300 present within a distance that can be traveled to in accordance with the minimum remaining travel distance calculated in step S4.

In step S6, the display control unit 616 displays the charging equipment information generated in step S5 on the display unit 64. Together with the charging equipment information, the display control unit 616 may generate information relating to charging equipment 300 present within a distance that can be traveled to in accordance with the remaining travel distance calculated in step S3, and display this information on the display unit 64 together with the charging equipment information.

FIG. 6 is a flow chart illustrating processing by the information provision system 1. In step S11, the charge amount determination unit 611 determines whether the charge amount of the battery 40 is less than the predetermined threshold. If the charge amount is less than the predetermined threshold (YES), the processing transitions to step S12, and if the charge amount is not less than the predetermined threshold (NO), the processing ends. The processing of step S11 in FIG. 6 is similar to the processing of step S1 in FIG. 5.

In step S12, the equipment determination unit 614 determines whether charging equipment 300 is present within a distance that can be traveled to in accordance with the remaining travel distance calculated by the remaining travel distance calculation unit 612. If there is no charging equipment 300 that is present within the distance that can be traveled to in accordance with the remaining travel distance (NO), the processing transitions to step S13. If there is charging equipment 300 that is present within the distance that can be traveled to in accordance with the remaining travel distance (YES), the processing ends.

In step S13, the information generation unit 615 generates position information for the vehicle 100 and charge amount decrease information indicating a decrease of the charge amount, and transmits the position information and the charge amount decrease information to the server 200. In step S14, the assistance information generation unit 211, on the basis of the position information and the charge amount decrease information, generates assistance information for assisting the vehicle 100, and transmits the assistance information to the assistance processing device 400.

In step S15, the status information generation unit 212 generates, on the basis of the assistance information generated by the assistance information generation unit 211, status information that indicates the status of assistance for the vehicle 100, and transmits the status information to the display device 60 of the vehicle 100. In step S16, the display control unit 616 displays, on the display unit 64, the status information that indicates the status of assistance for the vehicle 100 and is received from the server 200.

By virtue of the present embodiment, the following effects are achieved, for example. The vehicle 100 is provided with the charge amount determination unit 611 that determines whether the charge amount of the battery 40 is less than the predetermined threshold; the minimum remaining travel distance calculation unit 613 that calculates the minimum remaining travel distance on the basis of the error information for the vehicle 100 when the charge amount of the battery 40 is less than the predetermined threshold; and the display control unit 616 that displays, on the display unit 64 of the display device 60, the charging equipment information related to the charging equipment 300 present within a distance that can be traveled to in accordance with the minimum remaining travel distance.

In this way, the vehicle 100 displays, on the display unit 64, the minimum remaining travel distance that is based on the error information which takes into consideration, for example, variation or error for components that make up the vehicle 100. By this, a user of the vehicle 100 can grasp the minimum remaining travel distance when the charge amount of the battery 40 has decreased, and thus the vehicle 100 can reduce anxiety for the user when the charge amount of the battery has decreased.

The error information includes a lower limit for the average fuel efficiency of the vehicle 100, accuracy error for the vehicle sensor 20 of the vehicle 100, and deterioration error for the battery 40. By this, the vehicle 100 can appropriately calculate the minimum remaining travel distance.

The vehicle 100 is further provided with the remaining travel distance calculation unit 612 that, when the charge amount of the battery 40 is less than the predetermined threshold, calculates the remaining travel distance from the average fuel efficiency of the vehicle 100. By this, the vehicle 100 can display both of the remaining travel distance and the minimum remaining travel distance on the display unit 64 of the display device 60. Accordingly, a user of the vehicle 100 can grasp both of the remaining travel distance and the minimum remaining travel distance which are displayed on the display unit 64, and thus the vehicle 100 can reduce anxiety for the user when the charge amount of the battery has decreased.

In the information provision system 1, the vehicle 100 has an equipment determination unit 614 that, when the charge amount of the battery 40 is less than the predetermined threshold, determines whether charging equipment 300 is present within a distance that can be traveled to in accordance with the remaining travel distance; and an information generation unit 615 that, when the equipment determination unit 614 determines that charging equipment 300 is not present, generates position information for the vehicle 100 and charge amount decrease information indicating a decrease of the charge amount and transmits the position information for the vehicle 100 and the charge amount decrease information to the server 200. The server 200 has the assistance information generation unit 211 that, upon receiving the position information and the charge amount decrease information, generates, on the basis of the position information and the charge amount decrease information, assistance information for assisting the vehicle 100, and transmits the assistance information to the assistance processing device 400; and a status information generation unit 212 that generates, on the basis of the assistance information, status information that indicates the status of assistance for the vehicle 100, and transmits the status information to the vehicle 100.

By this, the information provision system 1 can swiftly assist the vehicle 100 in a case where charging equipment 300 is not present within the distance that can be traveled to in accordance with the remaining travel distance, and thus it is possible to reduce user anxiety when the battery charge amount has decreased.

Description was given for an embodiment of the present invention, but the present invention is not limited to this. The detailed configuration may be changed, as appropriate, within the scope of the spirit of the present invention.

EXPLANATION OF REFERENCE NUMERALS

1 Information provision system
100 Vehicle
200 Server
211 Assistance information generation unit
212 Status information generation unit
300 Charging equipment
400 Assistance processing device
611 Charge amount determination unit
612 Remaining travel distance calculation unit
613 Minimum remaining travel distance calculation unit
614 Equipment determination unit
615 Information generation unit
616 Display control unit

What is claimed is:

1. An information provision system comprising:
an information provision device;
a server communicably connected to the information provision device; and
an assistance processing device communicably connected to the server,
wherein the information provision device has a processor, the processor is configured to:
    determine whether a charge amount of a battery is less than a predetermined threshold;
    when the charge amount of the battery is less than the predetermined threshold, calculate a minimum remaining travel distance on the basis of error information for a vehicle;
    display, on a display device, charging equipment information relating to charging equipment present within a distance that can be traveled to in accordance with the minimum remaining travel distance;
    when the charge amount of the battery is less than the predetermined threshold, determine whether the charging equipment is Present within a distance that can be traveled to in accordance with a remaining travel distance calculated from an average fuel efficiency of the vehicle;
    when the charging equipment is not present, generate position information for the vehicle and charge amount decrease information indicating a decrease of the charge amount; and
    transmit the position information for the vehicle and the charge amount decrease information to the server, and
wherein the server has a server processor, the server processor is configured to:
    upon receiving the position information and the charge amount decrease information, generate, on the basis of the position information and the charge amount decrease information, assistance information for assisting the vehicle;
    transmit the assistance information to the assistance processing device;
    generate, on the basis of the assistance information, status information indicating a status of assistance for the vehicle, and
    transmit the status information to the information provision device.

2. The information provision system according to claim 1, wherein the error information includes a lower limit of an average fuel efficiency of the vehicle, an accuracy error of a vehicle sensor of the vehicle, and a deterioration error for the battery.

3. The information provision system according to claim 1, wherein, when the charge amount of the battery is less than the predetermined threshold, the processor is configured to calculate a remaining travel distance from an average fuel efficiency of the vehicle.

* * * * *